(12) United States Patent
Gokhale (10) Patent No.: US 8,484,968 B2
(45) Date of Patent: Jul. 16, 2013

(54) SYSTEM AND METHOD FOR OPERATING A COMPRESSION-IGNITION ENGINE

(75) Inventor: Manoj Prakash Gokhale, Bangalore (IN)

(73) Assignee: General Electric Company, Niskayuna, NY (US)

( * ) Notice: Subject to any disclaimer, the term of this patent is extended or adjusted under 35 U.S.C. 154(b) by 1350 days.

(21) Appl. No.: 11/095,441

(22) Filed: Mar. 31, 2005

(65) Prior Publication Data

US 2006/0218920 A1   Oct. 5, 2006

(51) Int. Cl.
*F02D 23/00* (2006.01)
*F02D 41/00* (2006.01)
*F02B 5/00* (2006.01)
*F02M 7/00* (2006.01)

(52) U.S. Cl.
USPC ............. 60/601; 123/305; 123/350; 123/435

(58) Field of Classification Search
USPC ................... 60/600–603; 123/380, 305, 294, 123/446, 350, 435, 262, 357, 501, 502
See application file for complete search history.

(56) References Cited

U.S. PATENT DOCUMENTS

| | | | | |
|---|---|---|---|---|
| 3,443,552 A * | 5/1969 | Von Seggern et al. | ........ | 123/262 |
| 4,397,285 A * | 8/1983 | O'Neill | .......... | 123/502 |
| 4,513,714 A * | 4/1985 | Dolenc et al. | ................ | 123/357 |
| 4,633,842 A | 1/1987 | Ikeda et al. | .................... | 123/501 |
| 5,103,789 A * | 4/1992 | Hartman et al. | .............. | 123/435 |
| 5,441,027 A * | 8/1995 | Buchanon et al. | ............ | 123/446 |
| 6,158,416 A | 12/2000 | Chen et al. | ..................... | 123/380 |
| 6,286,480 B1 | 9/2001 | Chen et al. | ..................... | 123/380 |
| 6,295,816 B1 | 10/2001 | Gallagher et al. | .............. | 60/611 |
| 6,318,308 B1 * | 11/2001 | Hsu et al. | ..................... | 123/48 A |
| 6,513,488 B2 * | 2/2003 | Enoki et al. | .................... | 123/305 |
| 6,557,347 B1 | 5/2003 | Alvarez et al. | .................. | 60/611 |
| 6,651,432 B1 * | 11/2003 | Gray, Jr. | ........................ | 123/305 |
| 6,651,677 B2 * | 11/2003 | Sukegawa et al. | ............ | 123/305 |
| 6,810,320 B2 * | 10/2004 | Yamamoto et al. | ........... | 123/435 |
| 6,899,089 B2 * | 5/2005 | Shiraishi et al. | .............. | 123/533 |
| 6,945,047 B2 * | 9/2005 | Shea et al. | ....................... | 60/602 |
| 6,976,936 B2 * | 12/2005 | Yamaoka et al. | ............. | 123/305 |
| 7,007,664 B2 * | 3/2006 | Takemoto et al. | ............ | 123/305 |
| 7,055,504 B1 * | 6/2006 | Gallagher et al. | ............ | 123/380 |
| 7,066,143 B1 * | 6/2006 | Gallagher et al. | ............ | 123/380 |
| 7,246,605 B2 * | 7/2007 | Nazarov et al. | ................ | 123/435 |
| 7,360,523 B2 * | 4/2008 | Sloane et al. | .................. | 123/305 |
| 2006/0266336 A1* | 11/2006 | Nazarov et al. | ................ | 123/501 |

FOREIGN PATENT DOCUMENTS

| | | | |
|---|---|---|---|
| DE | 197 05 463 | | 8/1998 |
| EP | 784153 A2 * | | 7/1997 |
| JP | 05099100 A * | | 4/1993 |
| WO | WO 03/095820 | | 11/2003 |

OTHER PUBLICATIONS

A translation of DE 19705463 A1 (Berger et al.) Aug. 20, 1998.*
A translation of WO 2003/095820 A1 (Betsch et al.) Nov. 20, 2003.*

* cited by examiner

*Primary Examiner* — Thai Ba Trieu
(74) *Attorney, Agent, or Firm* — Joesph J. Christian (57) ABSTRACT

A method of operating a compression-ignition engine includes adjusting timing of fuel injection if a sensed parameter indicative of a maximum pressure within a combustion chamber varies relative to a selected pressure and if fuel injection timing is greater than a preselected timing.

31 Claims, 7 Drawing Sheets

SYSTEM AND METHOD FOR OPERATING A COMPRESSION-IGNITION ENGINE

BACKGROUND

The present technique relates generally to a system and method of operating a compression-ignition engine and, more specifically, to a system and method for controlling peak cylinder pressure in a diesel engine operated at high altitude regions.

Compression-ignition engines, such as diesel engines, operate by directly injecting a fuel (e.g., diesel fuel) into compressed air in one or more piston-cylinder assemblies, such that the heat of the compressed air lights the fuel-air mixture. Compression-ignition engines also typically include a glow plug to provide heat to ensure ignition. The direct fuel injection atomizes the fuel into droplets, which evaporate and mix with the compressed air in the combustion chambers of the piston-cylinder assemblies. Typically, compression-ignition engines operate at a relatively higher compression ratio than spark ignition engines. The compression ratio directly affects the engine performance, efficiency, exhaust pollutants, and other engine characteristics. In addition, the fuel-air ratio affects engine performance, efficiency, exhaust pollutants, and other engine characteristics. Exhaust emissions generally include pollutants such as carbon oxides (e.g., carbon monoxide), nitrogen oxides (NOx), sulfur oxides (SOx), particulate matter (PM), and smoke. The amount and relative proportion of these pollutants varies according to the fuel-air mixture, compression ratio, injection timing, environmental conditions (e.g., atmospheric pressure, temperature, etc.), and so forth.

In certain applications, the compression-ignition engines are used in relatively extreme environmental conditions, such as high altitudes. For example, diesel powered locomotives can travel through a wide range of environmental conditions, particularly in mountainous regions. These environmental conditions can adversely affect engine performance, efficiency, exhaust pollutants, and other engine characteristics. For example, diesel engines operating in mountainous regions are subject to greater loads due to higher gradients, lower atmospheric pressures due to higher altitudes, lower temperatures due to colder climate or higher altitude, lower air density due to lower atmospheric pressure, and so forth. Fuel injection timing is advanced to improve engine efficiency. As a result, the peak in-cylinder pressure may rise to undesirable levels; emissions of pollutants may increase to unacceptable levels. The various engine parameters are particularly susceptible to exceed engine design limits when the engine is operating at a full load at extreme ambient temperature and altitude conditions. For example, an increase in peak in-cylinder pressure can be attributed to advance fuel injection timings, among other things. Unfortunately, existing engines do not adequately account for impact of advanced fuel injection timings on engine parameters, such as peak in-cylinder pressure.

Therefore, a technique is needed for controlling peak in-cylinder pressure for advanced fuel injection timing.

BRIEF DESCRIPTION

In accordance with one aspect of the present technique, a method of operating a compression-ignition engine is provided. The method includes adjusting timing of fuel injection if a sensed parameter indicative of a maximum pressure within a combustion chamber varies relative to a selected pressure and if fuel injection timing is greater than a preselected timing.

In accordance with another aspect of the present technique, a system including a compression-ignition engine is provided. The system includes a controller configured to retard fuel injection timing if a maximum pressure within a combustion chamber of the compression-ignition engine exceeds a predetermined pressure and if fuel injection timing exceeds a predetermined timing.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
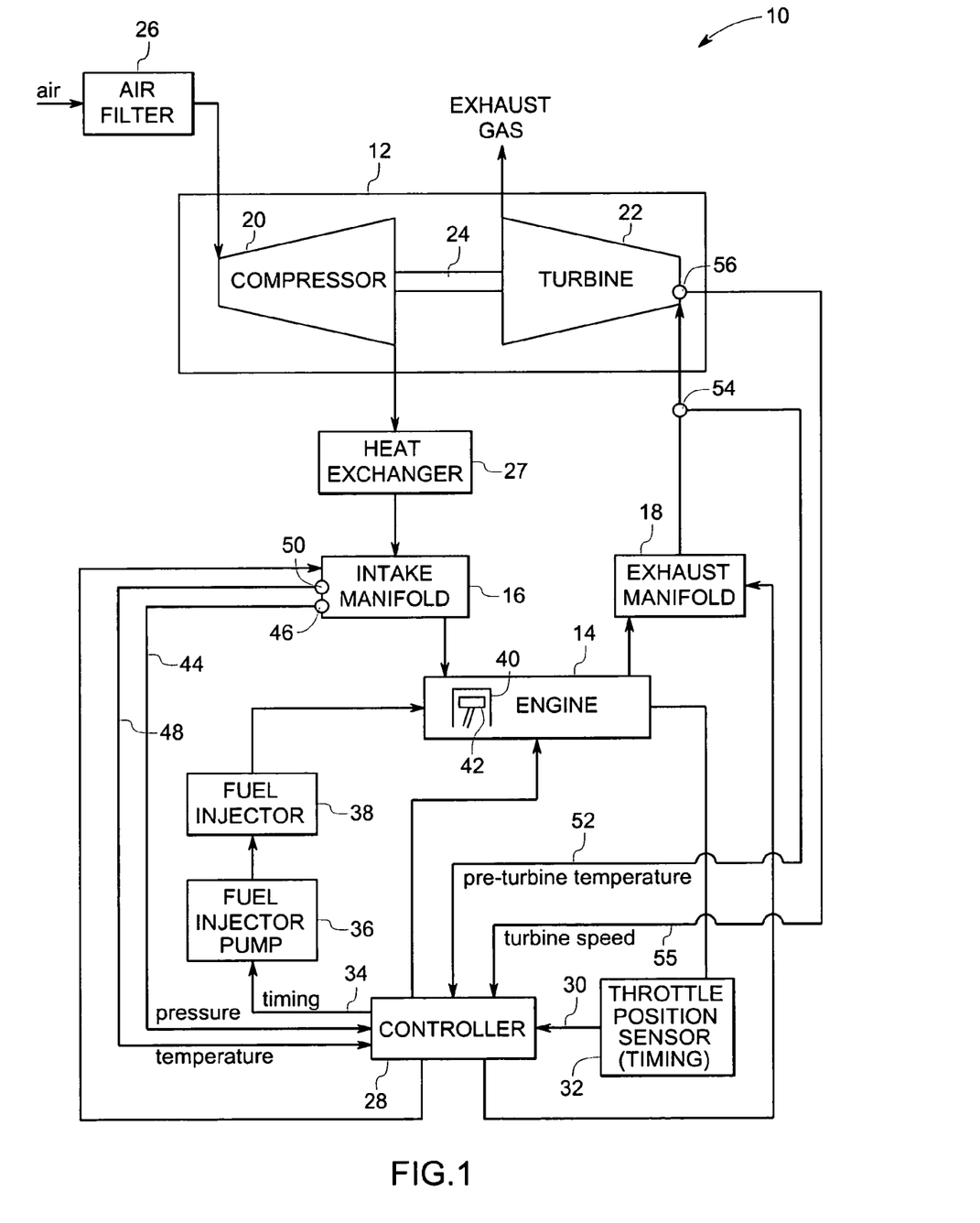
FIG. 1 is a diagrammatical representation of a compression-ignition engine, such as a locomotive power unit, having maximum in-cylinder pressure control features in accordance with an exemplary embodiment of the present technique.

Referring to FIG. 1, a locomotive power unit 10 have maximum in-cylinder control features is illustrated in accordance with certain embodiments of the present technique. The locomotive power unit 10 includes a turbo-charger 12 and a compression-ignition engine, e.g. a diesel engine 14. A motor-generator unit (not shown) may be mechanically coupled to the turbocharger 12. As discussed in further detail below, embodiments of the present technique provide monitoring and control features, such as sensors and control logic, to adjust engine characteristics affecting the maximum in-cylinder pressure within the compression-ignition engine, e.g., diesel engine 14. For example, in certain extreme environments such as high altitude mountainous regions, the maximum in-cylinder pressure is reduced to acceptable/desirable levels by retarding the fuel injection timing and/or by derating the engine power, reducing the manifold air pressure (MAP), or reducing the speed of the turbo-charger 12.

The illustrated engine 14 includes an air intake manifold 16 and an exhaust manifold 18. The turbo-charger 12 includes a compressor 20 and a turbine 22 and is operated to supply compressed air to the intake manifold 16 for combustion within the engine 14. The turbine 22 is coupled to the exhaust manifold 18 for extracting energy from exhaust gases for rotating a turbocharger shaft 24 connected to the compressor 20. The compressor 20 draws ambient air through a filter 26 and provides compressed air to a heat exchanger 27. The temperature of air is increased due to compression. The compressed air flows through the heat exchanger 27 such that the temperature of air is reduced prior to delivery into the intake manifold 16 of the engine 14. In one embodiment, the heat exchanger 27 is an air-to-water heat exchanger, which utilizes a coolant to facilitate removal of heat from the compressed air. In another embodiment, the heat exchanger is an air-to-air heat exchanger, which utilize ambient air to facilitate removal of heat from compressed air.

The power unit 10 also includes a controller 28. In the illustrated embodiment, the controller 28 is an electronic fuel injection controller 28 for the engine 14. In another embodiment, the controller 28 is an electronic logic controller that is programmable by a user. The controller 28 receives a throttle setting signal 30 from a throttle position sensor 32 provided to detect the position of an operator controlled throttle valve (not shown) of the engine 14. The controller 28 may be operable to produce a timing signal 34 to control operation of plurality of fuel injection pumps 36. The pumps 36 drives plurality of fuel injectors 38 for injecting fuel into a plurality of cylinders 40 of the engine 14. A piston 42 is slidably disposed in each cylinder 40 and reciprocates between a top dead center and a bottom dead center position. The controller 28 may also receive an intake manifold air pressure signal 44 generated by a pressure sensor 46, an intake manifold air temperature signal 48 generated by a temperature sensor 50, and a pre-turbine temperature signal 52 generated by a temperature sensor 54 provided to detect temperature of exhaust gas fed from the exhaust manifold 18 to the turbine 22. The controller 28 may also receive a turbocharger speed signal 55 from a speed sensor 56 provided to detect speed of the turbocharger 12.

Figure 2:
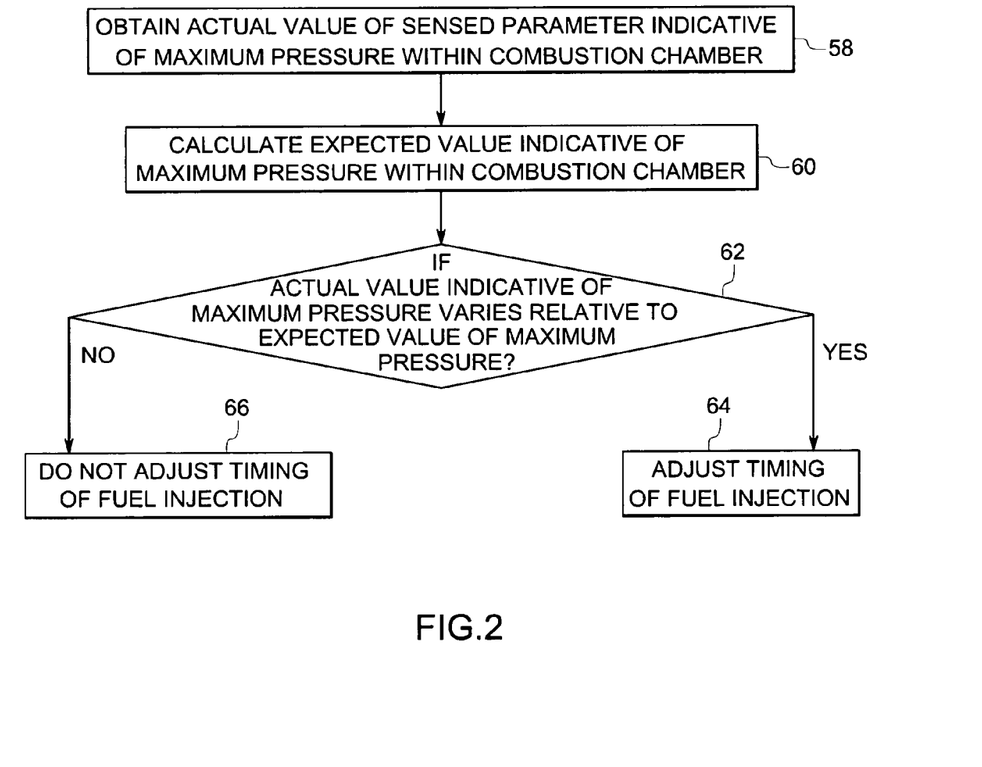
FIGS. 2 and 3 are flow charts illustrating various processes of controlling maximum pressure within a combustion chamber of a compression-ignition engine in accordance with certain embodiments of the present technique.

Referring to FIG. 2, this figure is a flow chart illustrating a method of operating the compression-ignition engine 14 of FIG. 1 in accordance with embodiments of the present technique. An actual value of a sensed parameter indicative of maximum pressure within a combustion chamber of the engine 14 is obtained as represented by step 58. For example, the actual value indicative of maximum pressure may be obtained via the pressure sensor 46 of FIG. 1. In another example, the actual value indicative of maximum pressure may be obtained based on a plurality of sensed operating parameters of the compression-ignition engine 14. An expected value indicative of maximum pressure within the combustion chamber is calculated as represented by step 60. For example, the air temperature within the intake manifold 16 may be obtained via the temperature sensor 50 of FIG. 1. As appreciated by those skilled in the art, the expected value indicative of maximum pressure can be calculated based on the actual value indicative of maximum pressure and the air temperature within the intake manifold 16.

The variation of the actual value of maximum pressure relative to the expected value of the maximum pressure is evaluated as represented by step 62. If the actual value indicative of the maximum pressure varies relative to the expected value indicative of the maximum pressure, timing of fuel injection within the combustion chamber is adjusted as represented by step 64. The detailed steps involved in the adjustment of fuel injection timing are described with reference to subsequent figures. If the actual value indicative of the maximum pressure does not vary relative to the expected value indicative of the maximum pressure, timing of fuel injection within the combustion chamber is not adjusted as represented by step 66.

Figure 3:
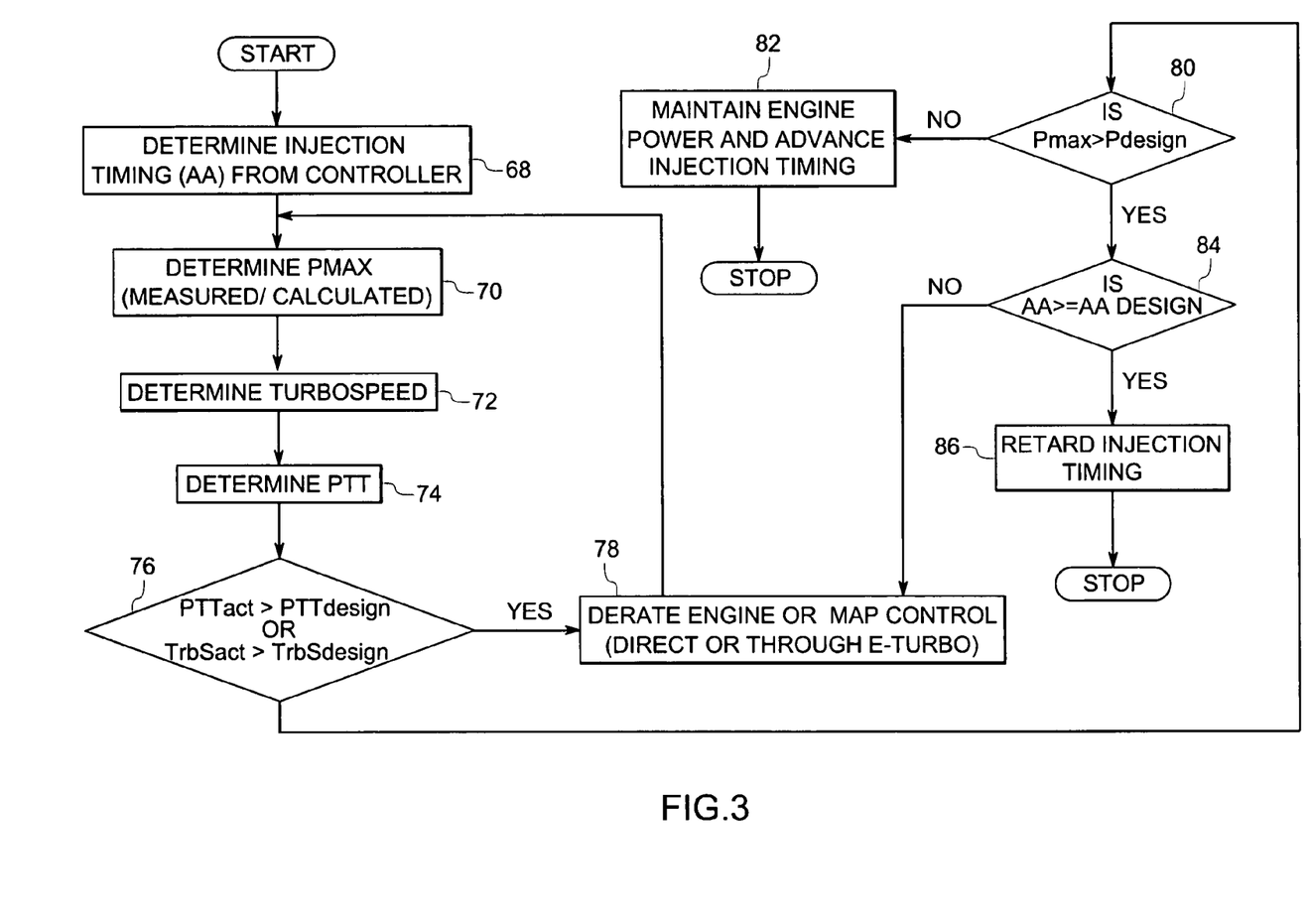

Referring to FIG. 3, this figure is a flow chart illustrating one embodiment of the method of operating the compression-ignition engine 14 of FIG. 1. In the illustrated embodiment, the controller 28 determines fuel injection timing (AA i.e. advance angle) based on the position of the throttle valve as represented by step 68. As discussed above, the actual value of the sensed parameter indicative of the maximum pressure within the combustion chamber of the engine 14 is obtained as represented by step 70. The expected value indicative of the maximum pressure within the combustion chamber is also calculated. The expected value indicative of the maximum pressure can be calculated based on the actual value indicative of the maximum pressure and the air temperature within the intake manifold 16.

The controller 28 receives the turbocharger speed signal 55 from the speed sensor 56 provided to detect speed of the turbocharger 12 as represented by step 72. The controller also receives the pre-turbine temperature (PTT) signal 52 generated by the temperature sensor 54 provided to detect temperature of exhaust gas fed from the exhaust manifold 18 to the turbine 22 as represented by step 74. The detected temperature of exhaust gas (PTTact) is compared to a predetermined temperature value (PTTdesign) as indicated by step 76. For example, the predetermined temperature value may be a design or expected value for the PTT. Alternatively, the actual detected speed (TrbSact) of the turbocharger 12 may also be compared to a predetermined speed value (TrbSdesign) of the turbocharger 12. For example, the predetermined speed value may be a design or expected value for the speed of the turbocharger 12. If the detected temperature of exhaust gas (PTTact) exceeds the predetermined temperature value (PTTdesign) or if the detected speed of the turbocharger (TrbSact) is greater than the predetermined speed value (TrbSdesign), then the controller 28 derates engine power, or controls speed of the turbine 22, or controls intake air pressure within the intake manifold 16 as represented by step 78.

If the detected temperature of exhaust gas (PTTact) is less than the predetermined temperature value (PTTdesign) or if the detected speed of the turbocharger (TrbSact) is less than the predetermined speed value (TrbSdesign), then the actual value indicative of the maximum pressure (Pmax) is compared to the expected value indicative of the maximum pressure (Pdesign) as represented by step 80. If the actual value indicative of the maximum pressure (Pmax) is less than the expected value indicative of the maximum pressure (Pdesign), then the power output of the engine is maintained and the fuel injection timing within the combustion chamber may be advanced as represented by step 82.

If the actual value indicative of the maximum pressure (Pmax) is greater than the expected value indicative of the maximum pressure (Pdesign), then the fuel injection timing (AA) is compared with an expected value (AAdesign e.g., 7 degrees) indicative of the fuel injection timing as illustrated by step 84. For example, expected value of the fuel injection timing may be 7 degrees. In certain other embodiments, the expected value of the fuel injection timing may vary as known to those skilled in the art.

In the illustrated embodiment, if the fuel injection timing (AA) is less than 7 degrees, then the controller 28 derates engine power, or controls speed of the turbine 22, or controls intake air pressure within the intake manifold 16. As known to those skilled in the art, the engine power is derated by controlling the amount of fuel injected into the combustion chamber. The motor-generator unit receives a control signal from the controller 28 and is operable to supply power to the turbocharger 12 or remove power from the turbocharger 12. When the motor-generator unit is operated as a motor, power is supplied to the turbocharger 12 and the turbine speed is increased. This forces additional air into the combustion chamber and also increases the intake manifold pressure. Conversely, when the motor-generator unit is operated as a generator, power is removed from the turbocharger 12 and the turbine speed is decreased. This reduces amount of air flow into the combustion chamber and also decreases the intake manifold pressure. If the fuel injection timing (AA) is greater than or equal to 7 degrees, then the fuel injection timing within the combustion chamber is retarded as represented by step 86. The fuel injector pump 36 is operable to receive the timing signal 34 from the controller 28 and control the fuel injector 38 for adjusting the fuel injection timing.

Figure 4:
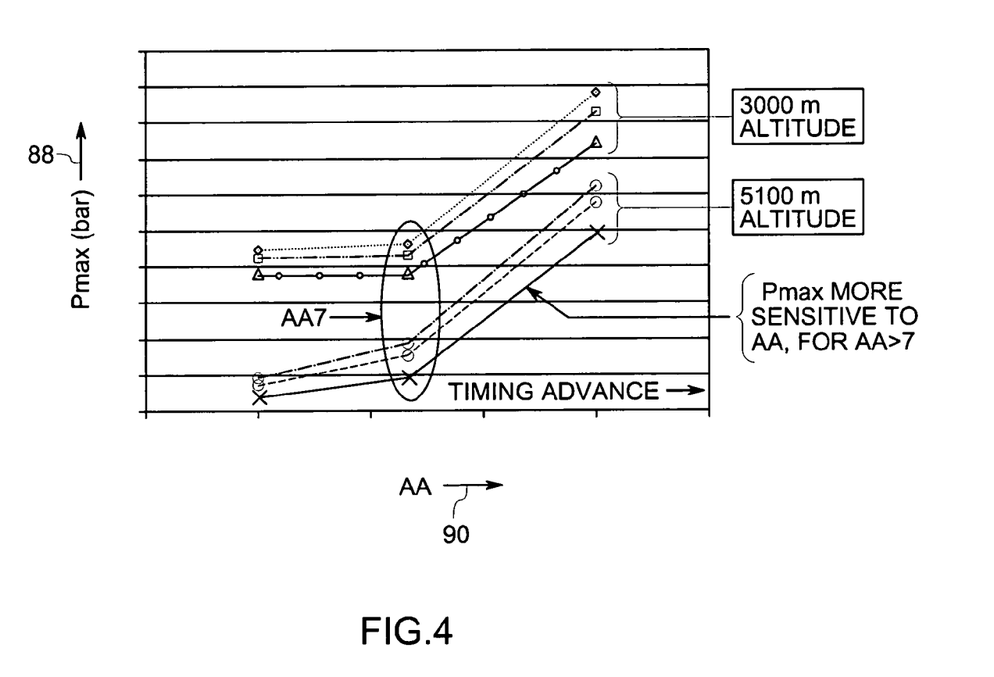
FIG. 4 is a graph illustrating variation of maximum pressure within a combustion chamber of a compression-ignition engine relative to fuel injection timing in accordance with an exemplary embodiment of the present technique.

Referring to FIG. 4, a graph representing the variation of the maximum pressure ($P_{max}$) 88 within the combustion chamber of the engine 14 relative to the fuel injection timing (AA) 90 within the combustion chamber is illustrated in accordance with embodiments of the present technique. The maximum pressure (Pmax) within the combustion chamber is dependent on engine power output, fuel injection timing, advance angle, ambient temperature, ambient pressure, turbocharger speed, intake manifold pressure, or the like. In the illustrated embodiment, the variation of maximum pressure (Pmax) relative to the fuel injection timing (AA) for two different ambient conditions (i.e. two altitudes of 3000 meters, and 5100 meters) is illustrated. The pressure increases relative to the fuel injection timing if the fuel injection timing is greater than or equal to about 7 degrees. Hence, the maximum pressure can be effectively controlled at fuel injection timing advance angles (AA) greater than or equal to 7 degrees due to the sensitivity of maximum pressure to the fuel injection timing.

The pressure within the combustion chamber increases to a maximum value due to combustion of fuel within the combustion chamber. If the fuel injection timing is advanced, the amount of fuel injected during compression stroke is increased. The combustion starts before the top dead center within the combustion chamber. Therefore pressure within the combustion chamber is increased.

In accordance with the present technique, if the fuel injection timing is retarded below 7 degrees, the fuel injection begins immediately before the top dead center, but the combustion occurs after the top dead center. Since the combustion occurs during the expansion stroke, the pressure rise due to combustion is compensated by pressure reduction due to the expansion stroke. Hence the maximum pressure is generated at the top dead center within the combustion chamber.

As discussed above, the maximum pressure is also dependent on the intake manifold pressure and the turbocharger speed. The turbocharger speed is dependent on the power output of the engine and also the ambient conditions. Hence if the fuel injection timing is retarded, the variation of maximum pressure relative to the fuel injection timing is reduced. For retarded fuel injection timings, the maximum pressure is effectively controlled by power deration, or by controlling turbocharger speed, or by controlling the intake manifold pressure, or a combination of the like. As discussed above, the engine power is derated by controlling the amount of fuel injection into the combustion chamber. The motor-generator unit receives a control signal from the controller 28 and is operable to control the turbine speed and intake manifold pressure.

Figure 5:
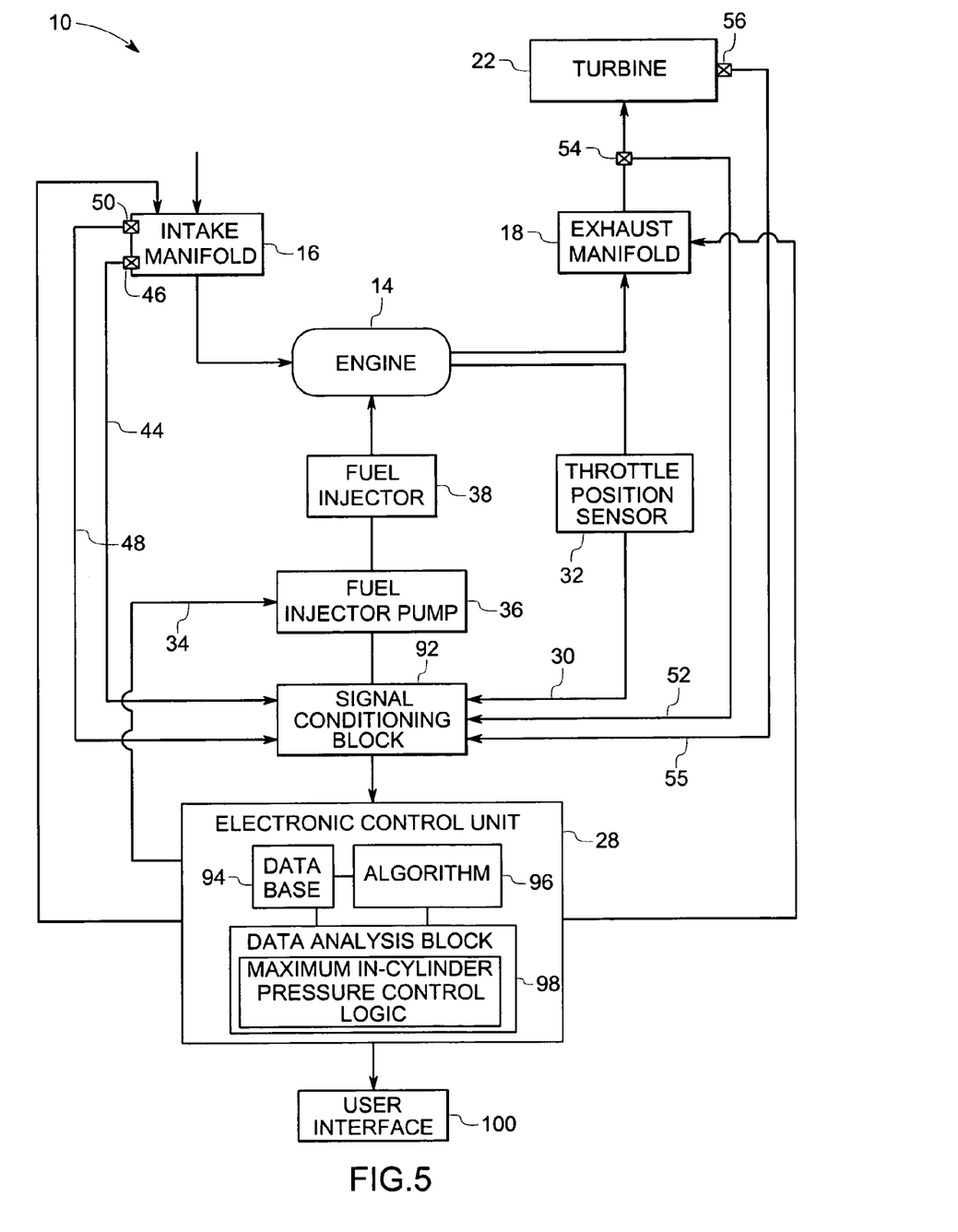
FIG. 5 is diagrammatical representation of a compression-ignition engine, such as a locomotive power unit, having a controller in accordance with an exemplary embodiment of the present technique.

Referring to FIG. 5, one embodiment of the locomotive power unit 10 is illustrated. As discussed with reference to FIG. 1, the controller 28 receives the throttle setting signal 30 from the throttle position sensor 32 provided to detect the position of the operator controlled throttle valve of the engine 14. The controller 28 may also receive the intake manifold air pressure signal 44 generated by the pressure sensor 46, the intake manifold air temperature signal 48 generated by the temperature sensor 50, and the pre-turbine temperature signal 52 generated by the temperature sensor 54 provided to detect temperature of exhaust gas fed from the exhaust manifold 18 to the turbine 22. The controller 28 may also receive the turbocharger speed signal 55 from the speed sensor 56 provided to detect speed of the turbocharger 12. A signal conditioning block 92 is provided to filter noise signals from the above-mentioned plurality of sensors from reaching the controller 28.

In the illustrated embodiment, the controller 28 may further include a database 94, an algorithm 96, and a data analysis block 98. The database 94 may be configured to store predefined information about the engine 14. For example, the database 94 may store information relating to temperature, and pressure of the engine 14, fuel injection timing, pre-turbine temperature, turbocharger speed, power output of the engine, or the like. Furthermore, the database 94 may be configured to store actual sensed/detected information from the above-mentioned sensors. The algorithm 96 facilitates the processing of signals from the above-mentioned plurality of sensors.

The data analysis block 98 may include a range of circuitry types, such as a microprocessor, a programmable logic controller, a logic module, etc. The data analysis block 98 in combination with the algorithm 96 may be used to perform the various computational operations relating to determination of the maximum pressure within the combustion chamber. In certain embodiments, the controller 28 may output data to a user interface 100. Advantageously, the user interface facilitates inputs from a user to the controller 28 and provides a mechanism through which a user can manipulate data and sensed properties from the controller 28. As will be appreciated by those skilled in the art, the user interface 100 may include a command line interface, menu driven interface, and graphical user interface. The controller 28 is operable to adjust engine characteristics affecting the maximum in-cylinder pressure within the compression-ignition engine. The maximum in-cylinder pressure is reduced to acceptable/desirable levels by retarding the fuel injection timing and/or by derating the engine power, reducing the manifold air pressure (MAP), or reducing the speed of the turbo-charger 12.

Figure 6:
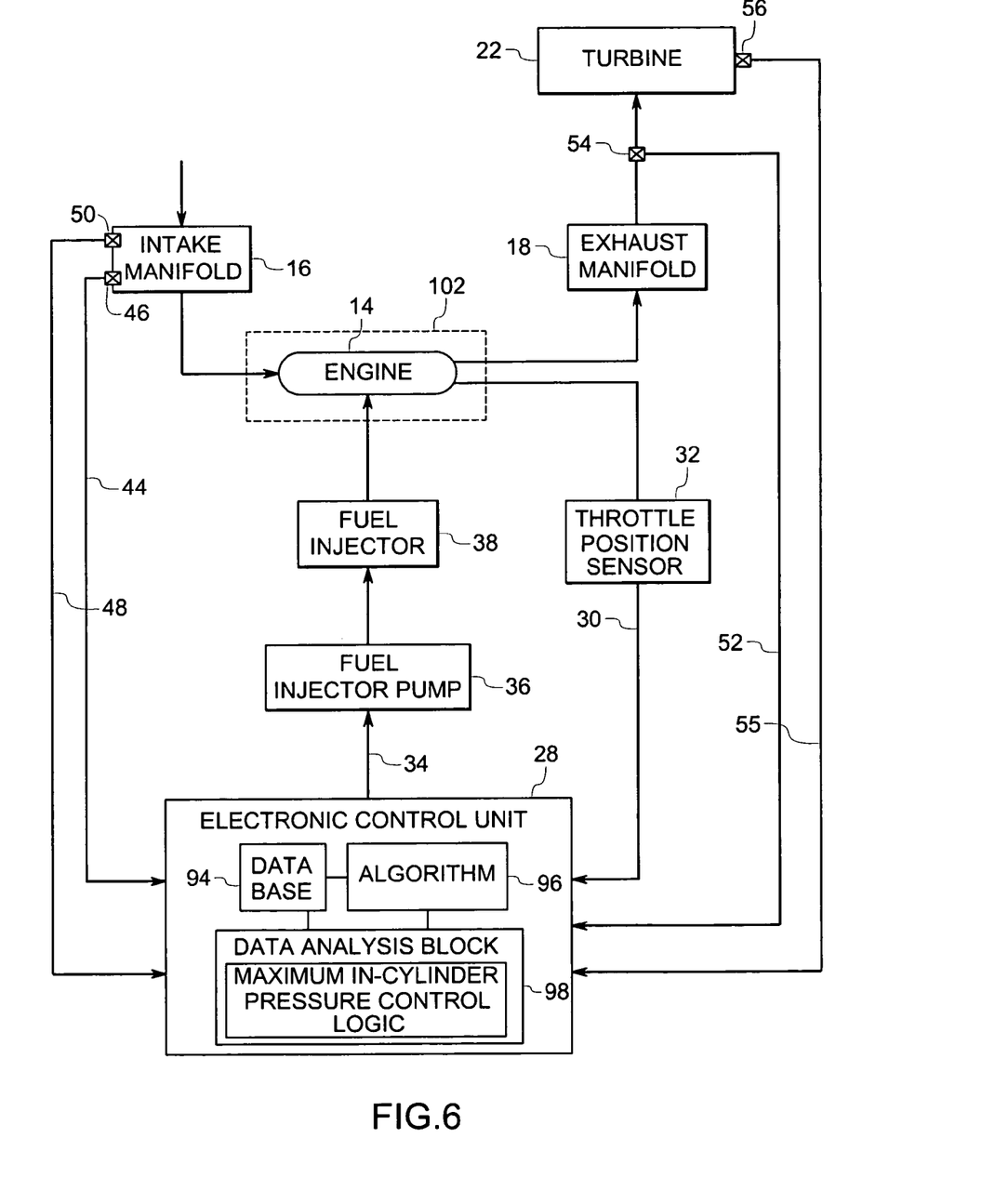
FIG. 6 is a diagrammatical representation of a system incorporating a compression-ignition engine, such as a locomotive power unit, having maximum in-cylinder pressure control features in accordance with an exemplary embodiment of the present technique.

Referring to FIG. 6, another embodiment of power unit 10 is illustrated. As illustrated above, the power unit 10 includes the turbo-charger 12 and the diesel engine 14. The power unit 10 may be used for driving a system 102. The system may include high altitude locomotive engine, automobile engine, or the like. The power unit 10 includes the controller 28. In the illustrated embodiment, the controller 28 is an electronic fuel injection controller 28 for the engine 14 of the system 102. The controller 28 receives the throttle setting signal 30 from the throttle position sensor 32 provided to detect the position of the operator controlled throttle valve (not shown) of the engine 14. The controller 28 may be operable to produce the timing signal 34 to control operation of the fuel injection pump 36. The pump 36 drives the fuel injector 38 for injecting fuel into the plurality of cylinders of the engine 14. The controller 28 may also receive the intake manifold air pressure signal 44 generated by the pressure sensor 46, the intake manifold air temperature signal 48 generated by the temperature sensor 50, and the pre-turbine temperature signal 52 generated by the temperature sensor 54 provided to detect temperature of exhaust gas fed from the exhaust manifold 18 to the turbine 22. The controller 28 may also receive the turbocharger speed signal 55 from the speed sensor 56 provided to detect speed of the turbocharger 12. The controller 28 as discussed previously controls the maximum in-cylinder pressure by retarding the fuel injection timing and/or by derating the engine power, reducing the manifold air pressure (MAP), or reducing the speed of the turbo-charger 12. The controller controls various parameters in a single step, in incremental steps, or in a fully proportional manner depending on the system design requirements and the capabilities of the motor-generator unit. For example, the amount of fuel injected may be approximately 2000 mg/cycle/cylinder for full load conditions to control peak pressure in the combustion chamber. In another example, turbospeed may be maintained at 22,000 rpm (revolutions per minute) for full load conditions. In yet another example, the manifold intake pressure may be maintained at 4 bars.

Figure 7:
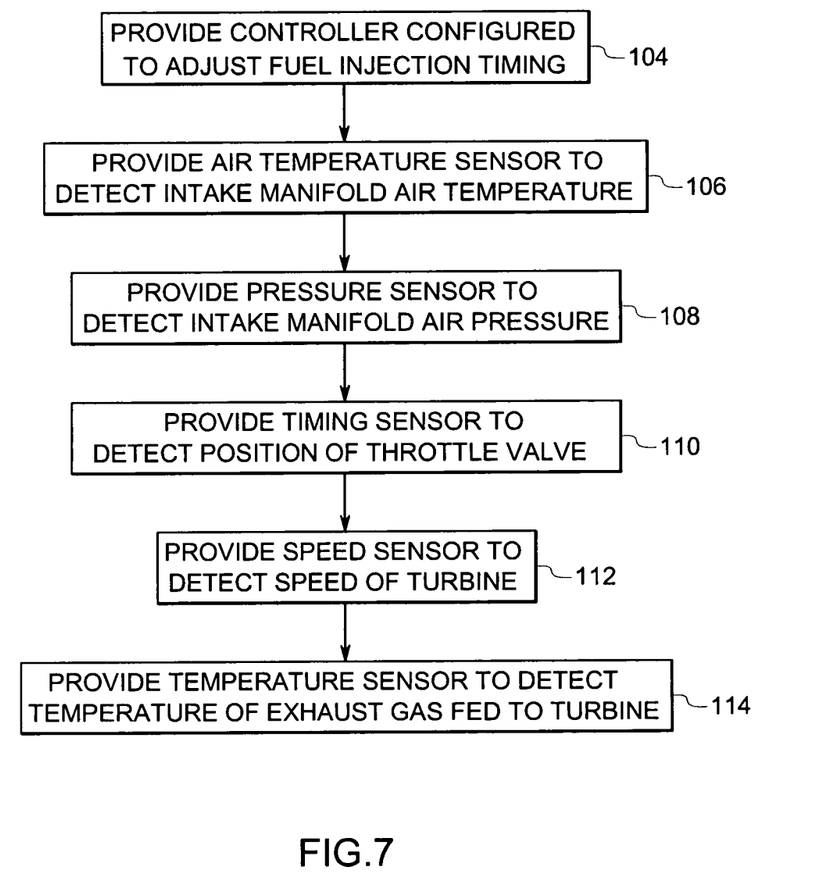
FIG. 7 is a flow chart illustrating an exemplary process of manufacturing a compression-ignition engine, such as a locomotive power unit, having maximum in-cylinder pressure control features in accordance with an exemplary embodiment of the present technique.

Referring to FIG. 7, this figure is a flow chart illustrating a method of manufacturing the power unit 10 in accordance with embodiments of the present technique. The method includes providing the controller 28 configured to adjust the fuel injection timing as represented by step 104. The controller 28 may be configured to retard fuel injection timing if the maximum pressure (Pmax) within the combustion chamber of the compression-ignition engine 14 exceeds the predetermined pressure (Pdesign) and if the fuel injection timing (AA) exceeds the predetermined timing (e.g., 7 degrees advance angle). The controller 28 may further include the database 94, the algorithm 96, and the data analysis block 98. The database 94 may be configured to store predefined information about the engine 14 and actual sensed/detected information relating to various parameters of the engine 14. The algorithm 96 facilitates the processing of signals from the plurality of sensors. The data analysis block 98 in combination with the algorithm 96 may be used to perform the various computational operations relating to determination of the maximum pressure within the combustion chamber. The air temperature sensor 50 is provided to detect intake manifold air temperature as represented by step 106. The method further includes providing the pressure sensor 46 configured to detect intake manifold air pressure as represented by step 108.

The method also includes providing the throttle position sensor 32 configured to detect the position of the throttle valve as represented by step 110. The speed sensor 56 is also provided to detect speed of the turbocharger 12 as represented by step 112. The method further includes providing the temperature sensor 54 configured to detect temperature of exhaust gas fed from the exhaust manifold 18 to the turbine 22 as represented by step 114.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a compression-ignition engine, comprising:
adjusting timing of fuel injection if a sensed parameter indicative of a maximum pressure associated with a top dead center within a combustion chamber varies relative to a preselected pressure and if a fuel injection timing is greater than a preselected timing; wherein the maximum pressure associated with the top dead center within the combustion chamber is controlled by adjusting timing of fuel injection.

2. The method of claim 1, further comprising calculating an expected value indicative of the maximum pressure associated with the top dead center within the combustion chamber.

3. The method of claim 2, further comprising obtaining an actual value of the sensed parameter indicative of the maximum pressure associated with the top dead center within the combustion chamber during operation of the compression-ignition engine.

4. The method of claim 1, further comprising calculating an expected value indicative of a timing of fuel injection within the combustion chamber.

5. The method of claim 4, further comprising obtaining an actual value indicative of the timing of fuel injection within the combustion chamber during operation of the compression-ignition engine.

6. The method of claim 5, further comprising retarding timing of fuel injection if the actual value of the sensed parameter indicative of the maximum pressure associated with the top dead center within the combustion chamber exceeds the expected value indicative of the maximum pressure and if the actual value indicative of timing of fuel injection exceeds the expected value indicative of timing of fuel injection.

7. The method of claim 6, further comprising subsequently advancing the timing of fuel injection if the actual value indicative of the maximum pressure associated with the top dead center is less than the expected value indicative of the maximum pressure within the combustion chamber.

8. The method of claim 1, wherein the compression-ignition engine is operated at a high altitude greater than about 3000 meters.

9. The method of claim 1, further comprising derating engine power, or controlling speed of a turbine coupled to the compression-ignition engine, or controlling intake air pressure within an intake manifold coupled to the compression-ignition engine, if an actual value indicative of the speed of the turbine exceeds an expected value indicative of the speed of the turbine or if an actual value indicative of temperature of exhaust gas fed to the turbine exceeds an expected value indicative of temperature of exhaust gas fed to the turbine.

10. The method of claim 1, wherein the maximum pressure associated with the top dead center within the combustion chamber is controlled in response to change in altitude.

11. A method of operating a compression-ignition engine, comprising:
retarding timing, in a high altitude environment, of fuel injection into the compression-ignition engine if an actual peak pressure exceeds a predetermined peak pressure within a combusion chamber and if an actual fuel injection timing exceeds a predetermined fuel injection timing, wherein the actual peak pressure within the combustion chamber is controlled by retarding timing of fuel injection.

12. The method of claim 11, further comprising derating engine power, or releasing air from an air intake manifold coupled to the compression-ignition engine, or decreasing speed of a turbocharger coupled to the compression-ignition engine, or a combination thereof, if the actual peak pressure exceeds the predetermined peak pressure and if the actual fuel injection timing is less than the predetermined fuel injection timing.

13. The method of claim 11, wherein the actual peak pressure within the combustion chamber is controlled in response to change in altitude.

14. A method of manufacturing a compression-ignition engine, comprising:
providing a controller configured to control a maximum pressure associated with a top dead center within a combustion chamber of the compression-ignition engine by retarding fuel injection timing if the maximum pressure associated with the top dead center within the combustion chamber of the compression-ignition engine exceeds a predetermined pressure and if fuel injection timing exceeds a predetermined timing.

15. The method of claim 14, comprising providing the compression-ignition engine having the controller.

16. The method of claim 14, comprising providing a vehicle having the compression-ignition engine and the controller coupled to the compression-ignition engine.

17. The method of claim 14, wherein the controller is configured to control maximum pressure associated with the top dead center within the combustion chamber in response to change in altitude.

18. A method of operating a turbocharged compression-ignition engine, comprising:
adjusting one or more parameters of the compression-ignition engine if a sensed parameter indicates an undesirable peak pressure within a combustion chamber of the compression-ignition engine, comprising:
retarding fuel injection timing to control the peak pressure within the combustion chamber of the compression-ignition engine if another sensed parameter indicates that fuel injection timing is greater than a preselected value; or
adjusting power output of the compression-ignition engine, or adjusting speed of a turbine coupled to the compression-ignition engine, or adjusting intake manifold air pressure, or combinations thereof, if the other sensed parameter indicates that fuel injection timing is less than the preselected value.

19. The method of claim 18, further comprising powering a locomotive.

20. The method of claim 18, further comprising powering an automobile.

21. A method of operating a compression-ignition engine, comprising:
adjusting timing of fuel injection if a sensed parameter indicative of a maximum pressure within a combustion chamber varies relative to a preselected pressure and if an actual fuel injection timing is greater than a preselected timing; wherein the maximum pressure within the combustion chamber is controlled by adjusting timing of fuel injection;
derating engine power, or releasing air from an air intake manifold coupled to the compression-ignition engine, or decreasing speed of a turbocharger coupled to the compression-ignition engine, or a combination thereof, if the maximum pressure within the combustion chamber exceeds the preselected pressure and if the actual fuel injection timing is less than the preselected timing.

22. A computer-readable medium storing a program to enable a controller to perform control of a compression-ignition engine, the computer program comprising:
programming instructions stored in a computer-readable medium that enable the controller to control a peak pressure within a combustion chamber of the compression-ignition engine by retarding fuel injection timing if the peak pressure within the combustion chamber of the compression-ignition engine exceeds a predetermined pressure and if fuel injection timing exceeds a predetermined timing.

23. A system, comprising:
a controller configured to retard fuel injection timing if a maximum pressure associated with a top dead center within a combustion chamber of the compression-ignition engine exceeds a predetermined pressure and if fuel injection timing exceeds a predetermined timing, wherein the controller is configured to control the maximum pressure associated with the top dead center within the combustion chamber by retarding fuel injection timing.

24. The system of claim 23, further comprising an intake air temperature sensor, an intake air pressure sensor, and a fuel injection timing sensor.

25. The system of claim 24, wherein the controller is configured to determine the maximum pressure associated with the top dead center in the combustion chamber based on signals from the intake air temperature sensor, or the intake air pressure sensor, or the fuel injection timing sensor, or a combination thereof.

26. The system of claim 23, further comprising a turbocharger speed sensor and an exhaust temperature sensor.

27. The system of claim 26, wherein the controller is configured to derate engine power, or control speed of a turbine, or control pressure within an air intake manifold coupled to the compression-ignition engine, if a value indicative of a speed of a turbine exceeds an expected speed value or if a value indicative of a temperature of exhaust gas exceeds an expected temperature value.

28. The system of claim 23, comprising a diesel engine having the controller.

29. The system of claim 23, comprising a vehicle having the compression-ignition engine and the controller coupled to the compression-ignition engine.

30. The system of claim 23, wherein the controller is configured to control maximum pressure associated with the top dead center within the combustion chamber in response to change in altitude.

31. A system, comprising:
a controller configured to retard fuel injection timing if a maximum pressure within a combustion chamber of the compression-ignition engine exceeds a predetermined pressure and if fuel injection timing exceeds a predetermined timing;
wherein the controller is configured to derate engine power, or control speed of a turbine, or control pressure within an air intake manifold coupled to the compression-ignition engine, if a value indicative of a speed of a turbine exceeds an expected speed value or if a value indicative of a temperature of exhaust gas exceeds an expected temperature value.

* * * * *

UNITED STATES PATENT AND TRADEMARK OFFICE
CERTIFICATE OF CORRECTION

PATENT NO. : 8,484,968 B2
APPLICATION NO. : 11/095441
DATED : July 16, 2013
INVENTOR(S) : Gokhale It is certified that error appears in the above-identified patent and that said Letters Patent is hereby corrected as shown below:

On the Title Page, in Item (74), under "Attorney, Agent, or Firm," in Column 2, Line 1, delete "Joesph J. Christian" and insert -- Joseph J. Christian --, therefor.

In the Claims:

In Column 8, Line 52, in Claim 11, delete "combusion" and insert -- combustion --, therefor.

Signed and Sealed this
Third Day of September, 2013

Teresa Stanek Rea
*Acting Director of the United States Patent and Trademark Office*